(12) United States Patent
Kartik et al.

(10) Patent No.: US 8,689,358 B2
(45) Date of Patent: Apr. 1, 2014

(54) DYNAMIC MODE NANO-SCALE IMAGING AND POSITION CONTROL USING DEFLECTION SIGNAL DIRECT SAMPLING OF HIGHER MODE-ACTUATED MICROCANTILEVERS

(75) Inventors: Venkataraman Kartik, Zurich (CH); Charalampos Pozidis, Thalwil (CH); Deepak R. Sahoo, Zurich (CH); Abu Sebastian, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 12/824,337

(22) Filed: Jun. 28, 2010

(65) Prior Publication Data

US 2011/0321202 A1  Dec. 29, 2011

(51) Int. Cl.
  *G01Q 10/00*  (2010.01)
  *G01Q 20/02*  (2010.01)

(52) U.S. Cl.
  USPC ..................................... 850/4; 850/1; 850/3

(58) Field of Classification Search
  USPC .................... 850/1, 4, 33, 37–39, 3
  See application file for complete search history.

(56) References Cited

U.S. PATENT DOCUMENTS

| | | | |
|---|---|---|---|
| 5,047,649 A * | 9/1991 | Hodgson et al. ................. 850/1 |
| 5,224,376 A * | 7/1993 | Elings et al. ..................... 73/105 |
| RE34,331 E * | 8/1993 | Elings et al. .................. 250/306 |
| 5,418,363 A * | 5/1995 | Elings et al. ....................... 850/1 |
| 5,466,935 A * | 11/1995 | Ray et al. .......................... 850/4 |
| 5,519,212 A * | 5/1996 | Elings et al. ................... 250/234 |
| 5,773,824 A * | 6/1998 | Flecha et al. ...................... 850/1 |
| 6,000,947 A * | 12/1999 | Minne et al. ................... 438/759 |
| 6,779,387 B2 * | 8/2004 | Degertekin ...................... 73/105 |
| 7,555,938 B2 * | 7/2009 | Bargatin et al. .............. 73/64.53 |
| 7,569,077 B2 * | 8/2009 | Kollin .............................. 850/19 |
| 7,748,052 B2 * | 6/2010 | Kojima .............................. 850/4 |
| 7,761,255 B1 * | 7/2010 | Sokolov ......................... 702/134 |
| 7,891,015 B2 * | 2/2011 | Russell .............................. 850/4 |
| 8,023,393 B2 | 9/2011 | Duerig et al. |
| 2004/0026007 A1 * | 2/2004 | Hubert et al. .................... 156/64 |
| 2008/0011065 A1 * | 1/2008 | Su et al. ........................... 73/105 |
| 2009/0003189 A1 * | 1/2009 | Binnig et al. .................. 369/154 |
| 2009/0100554 A1 * | 4/2009 | Arnold et al. .................... 850/39 |
| 2009/0265819 A1 * | 10/2009 | Watanabe et al. ............... 850/21 |
| 2010/0017923 A1 * | 1/2010 | Pittenger et al. ................ 850/21 |

(Continued)

OTHER PUBLICATIONS

Lantz, "Dynamic superlubricity and the elimination of wear on the nanoscale", Nature Nanotechnology, Aug. 2, 2009, DOI: 10.1038/NNANO.2009,199; 6 pages.

(Continued)

*Primary Examiner* — David A Vanore
*Assistant Examiner* — Wyatt Stoffa
(74) *Attorney, Agent, or Firm* — Cantor Colburn LLP; Daniel Morris

(57) ABSTRACT

An apparatus is provided and includes a cantilever having a tip at a distal end thereof disposed with the tip positioned an initial distance from a sample and a circuit electrically coupled to a substrate on which the sample is layered and the cantilever to simultaneously apply direct and alternating currents to deflect the cantilever and to cause the tip to oscillate about a point at a second distance from the sample, which is shorter than the initial distance, between first positions, at which the tip contacts the sample, and second positions, at which the tip is displaced from the sample.

21 Claims, 5 Drawing Sheets

(56) References Cited

U.S. PATENT DOCUMENTS

| | | | |
|---|---|---|---|
| 2010/0024082 A1* | 1/2010 | Ando et al. | 850/33 |
| 2010/0077516 A1* | 3/2010 | Bhaskaran et al. | 850/41 |
| 2010/0085056 A1* | 4/2010 | Baechtold et al. | 324/345 |
| 2010/0116038 A1* | 5/2010 | Baechtold et al. | 73/105 |
| 2010/0175156 A1* | 7/2010 | Cannara et al. | 850/56 |
| 2010/0201289 A1* | 8/2010 | Pozidis et al. | 318/116 |
| 2010/0269232 A1* | 10/2010 | Workman | 850/33 |
| 2011/0004967 A1* | 1/2011 | Jesse et al. | 850/21 |
| 2011/0010809 A1* | 1/2011 | Arnold et al. | 850/37 |
| 2011/0035849 A1* | 2/2011 | Finlan et al. | 850/6 |
| 2011/0047662 A1* | 2/2011 | Rangelow et al. | 850/33 |
| 2011/0113517 A1* | 5/2011 | Duerig et al. | 850/56 |
| 2011/0126329 A1* | 5/2011 | Despont et al. | 850/52 |
| 2011/0296561 A1* | 12/2011 | Humphris et al. | 850/4 |
| 2011/0314577 A1* | 12/2011 | Scheuring et al. | 850/11 |
| 2011/0321202 A1 | 12/2011 | Kartik et al. | |

OTHER PUBLICATIONS

Su et al, "Studies of tip wear processes in tapping mode atomic force microscopy", Science Direct, DOI: 10.1016/ S0304-399, 2003; 10 pages.

* cited by examiner

DYNAMIC MODE NANO-SCALE IMAGING AND POSITION CONTROL USING DEFLECTION SIGNAL DIRECT SAMPLING OF HIGHER MODE-ACTUATED MICROCANTILEVERS

BACKGROUND

Aspects of the present invention are directed to an apparatus and method for dynamic mode nano-scale imaging and position control using deflection signal direct sampling of higher mode-actuated microcantilevers.

Scanning probe microscopy (SPM) based techniques have many practical applications such as mask-less lithography, semiconductor metrology and ultra-high density data storage. However, low throughput and durability have to be overcome before such applications can become widespread. One way to improve the throughput and the durability of probe-based devices is to employ a large number of parallel microcantilevers that are mass-fabricated as a microelectromechanical-systems (MEMS) device. In spite of such massive parallelism, tip-wear and sample damage in MEMS-SPM devices can be significant.

In parallel SPM applications, available electronic resources per microcantilever are limited. In contact mode (CM) SPM methods, images are captured by direct sampling of the microcantilever deflection signal. Due to its low cost of implementation, CM operation is typically employed in parallel SPM applications. On a similar note, in high-speed SPM applications, one of the reasons for CM imaging being employed is the constraint on electronic resources. However, such CM operations can distort the sample surface and wear the microcantilever's tip.

Recently, in order to decrease the tip-wear, tip-sample force was modulated at a very high frequency while operating in CM. While this demonstrated significant wear reduction, this scheme has only been applied to polymer samples and it is unclear that it would perform as well on non-polymer samples. It is also unclear what impact the modulating would have on the sample's properties.

Compared to such CM schemes, intermittent-contact (IC) operations impose less wear on both the microcantilever and the sample and include, for example, tapping mode (TM) operations, which have reported reduced tip and sample wear. However, TM and similar IC methods require demodulation electronics to extract the amplitude, phase and frequency information of microcantilever oscillation and, as such, add cost and fabrication complexity. Such IC methods are, therefore, less attractive for many parallel SPM applications.

SUMMARY

In accordance with an aspect of the invention, an apparatus is provided and includes a cantilever, having a distal end tip, disposed with the tip positioned at a first point at an initial distance from a sample and a circuit, which is electrically coupled to a substrate on which the sample is layered and the cantilever, to deflect the cantilever such that the tip is displaced to a second point at a second distance from the sample, which is shorter than the initial distance, and to cause the tip to oscillate about the second point between tip-sample contact positions and tip-sample non-contact positions.

In accordance with another aspect of the invention, an apparatus is provided and includes a substrate on which a sample is layered, a plurality of cantilevers, each having a distal end tip, disposed with each of the tips respectively positioned at a first point at an initial distance from the sample, a circuit, which is electrically coupled to the substrate and each of the cantilevers, to deflect each of the cantilevers such that each of the tips is respectively displaced to a second point at a second distance from the sample, which is shorter than the initial distance, and to cause the each of the tips to oscillate about the second point between tip-sample contact positions and tip-sample non-contact positions, a translation unit to move the sample relative to the cantilevers, wherein tip position measurements for each of the tips of each of the cantilevers are obtained by direct sampling of cantilever deflection signals during the oscillation and the movement as being reflective of sample topographies at multiple sample locations/

In accordance with another aspect of the invention, an imaging and position control method is provided by which an image of a sample topography is obtained from a deflection signal reflective of positions of a measuring tip for measuring the sample topography, the measuring tip being deflected towards and moved across the sample and, while deflected, being further caused to oscillate between tip-sample contact positions and tip-sample non-contact positions.

In accordance with yet another aspect of the invention, an imaging and position control method is provided and includes deflecting cantilevers, each having a distal end tip, to reduce a distance between each of the tips and a sample from an initial un-deflected distance, causing each of the tips to oscillate between tip-sample contact positions and tip-sample non-contact positions, translational moving of each of the cantilevers relative to the sample and determining tip positions during the oscillating and the translational moving from which an image reflecting a sample topography is obtainable.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

For effective employment of IC methods and, specifically, for highly-parallel MEMS-SPM, key improvements are provided for and described herein. For reduction of wear and for low normal forces, cantilever oscillations at small amplitudes are employed and cantilevers of low stiffness, especially for minimally-invasive imaging for, say, biological samples, are used. Sustaining these small amplitude oscillations with such low stiffness microcantilevers is also addressed. To counter the fabrication induced non-uniform pre-bending of cantilevers in an array, the cantilevers are actively deflected towards the sample to achieve a short working distance between the tips and the sample's surface. Thus, in accordance with aspects of the invention, an electrostatically-actuated cantilever is provided whereby the cantilever's higher bending modes are used, which is a method that is relatively simple to implement and offers the practical benefits of dynamic mode methods.

Figure 1:
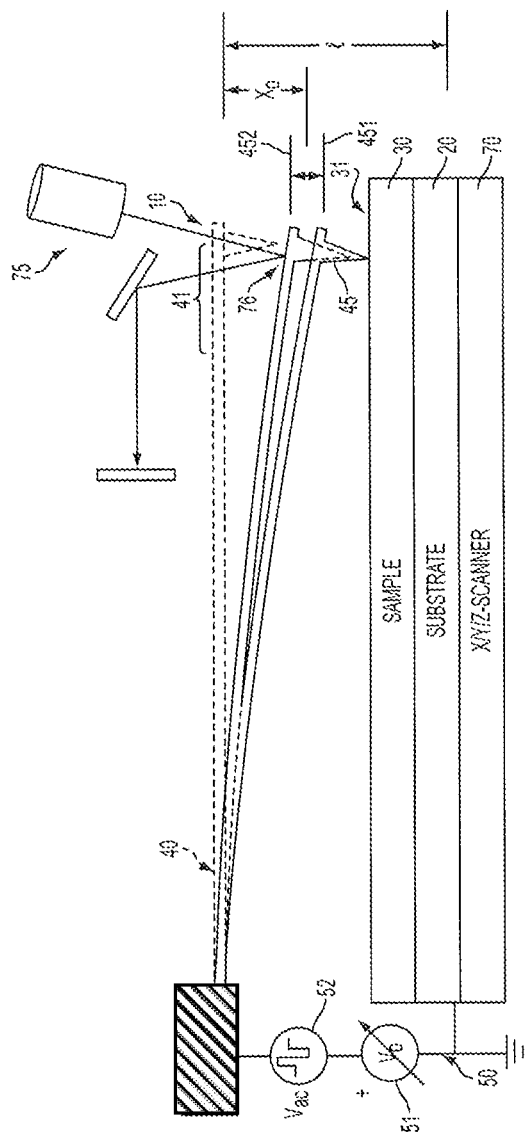
FIG. 1 is a schematic illustration of an apparatus in accordance with embodiments of the invention.
Figure 2:
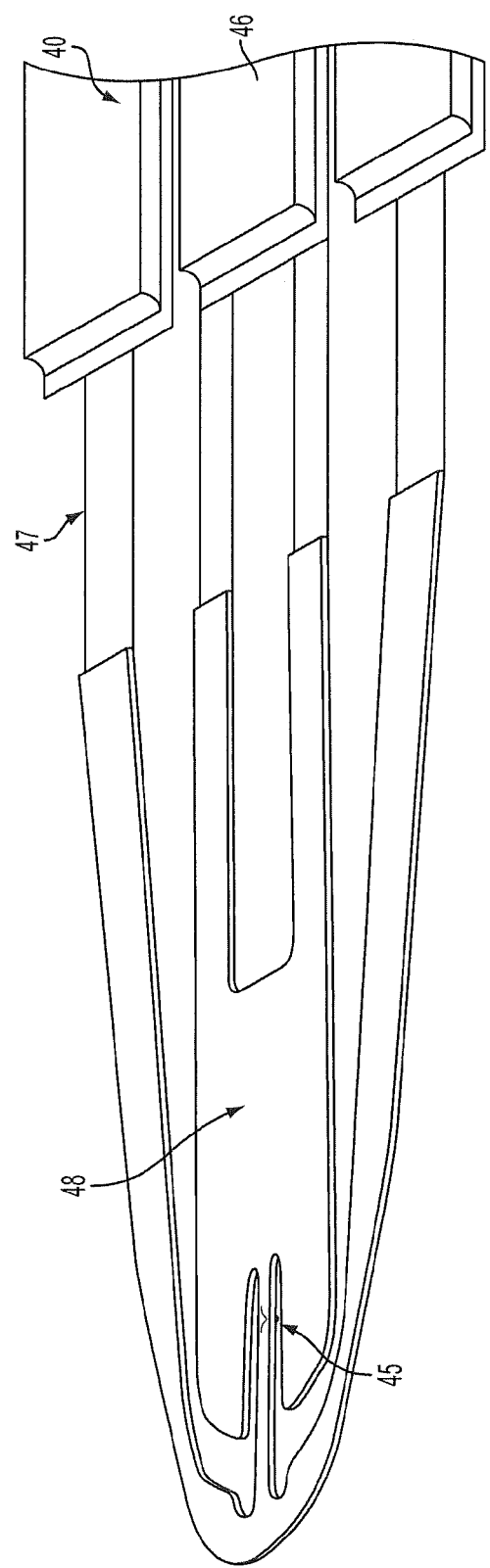
FIG. 2 is a perspective view of a cantilever of the apparatus of FIG. 1.

With reference to FIGS. 1 and 2, an apparatus 10 is provided and includes a substrate 20 on which a sample 30 is layered and a cantilever 40, such as a microcantilever, having a sample measuring tip 45 at a distal end 41 thereof. The cantilever 40 is disposed proximate to and at a vertical distance, l, from the substrate 20 such that the sample measuring tip 45 is positioned at a first point at an initial vertical distance from the sample 30. As shown in FIG. 2, the cantilever 40 is supported on a supporting structure 46 and includes a hinge 47, which is coupled to the supporting structure 46, and an electrostatic-actuation platform 48 at which the sample measuring tip 45 is disposed. The electrostatic-actuation platform 48 is coupled to a distal end of the hinge 47 and is thinner than the supporting structure 46. The hinge 47, on the other hand, is thinner than the electrostatic-actuation platform 48 to thereby facilitate electrostatic-actuation platform 48 operation. The cantilever 40 may be electrically conducting and may have a relatively high doping concentration.

The apparatus 10 further includes a circuit 50, which is electrically coupled to the substrate 20 and the cantilever 40. The circuit 50 includes a direct current source 51 and an alternating current source 52, which are arranged in series with respect to one another between the substrate 20 and the cantilever 40. The circuit 50 is therefore configured to simultaneously apply a DC voltage, $V_0$, and an AC voltage, $V_{ac}$, to the cantilever 40. The DC voltage, $V_0$, generates an attractive electrostatic force between the cantilever 40 and the substrate 20. This attractive electrostatic force deflects the cantilever 40 toward the substrate 20 by a vertical distance, $X_0$. With the cantilever 40 deflected, the AC voltage, $V_{ac}$, is applied for higher or second mode dynamic oscillation.

That is, the AC voltage, $V_{ac}$, causes the sample measuring tip 45 to oscillate about a second point at a second distance from the sample 30, which is shorter than the initial distance by the vertical distance, $X_0$. This oscillation of the sample measuring tip 45 occurs between first and second positions 451, 452. At the first positions 451, the sample measuring tip 45 contacts a surface 31 of the sample 30 and may therefore be considered tip-sample contact positions. Conversely, at the second positions 452, the sample measuring tip 45 is displaced from the surface 31 of the sample 30 and may therefore be considered tip-sample non-contact positions.

With the AC voltage, $V_{ac}$, being applied for higher or second mode dynamic oscillation, sample measuring tip 45 adhesion to the surface 31 may be avoided and cantilever 40 stiffness may be reduced as compared to standard higher mode SPM.

As shown in FIG. 1, a surface of the substrate 20 and the surface 31 of the sample 30 are each substantially flat and planarized when being inspected at a macroscopic scale. At the nano-scale, however, at least the surface 31 of the sample 30 is characterized by summits and troughs that are associated with positions of individual atoms or molecules within the arrangement of the sample 30 lattice. It is these individual atoms and molecules that repel the sample measuring tip 45 in opposition to the downward oscillatory movement of the cantilever 40 when the sample measuring tip 45 approaches the surface 31. As will be discussed below, the various points at which the sample measuring tip 45 is repulsed from the surface 31 can be employed to generate a nano-scale image of the surface 31.

Still referring to FIG. 1, a scanner 70 acts as a translation unit and drives relative translational movement of the substrate 20 with respect to the cantilever 40 or, as the case may be plural cantilevers 40 (see FIG. 4), such that the sample measuring tip 45 moves across the surface 31. That is, the scanner 70 may drive the cantilever 40 and the sample measuring tip 45 relative to the surface 31, the surface 31 relative to the cantilever 40 and the sample measuring tip 45 or both relative to each other. In this way, the sample measuring tip 45 contacts the surface 31 at multiple locations of the sample 30 when the sample measuring tip 45 occupies the tip-sample contact positions and is displaced from those multiple locations when the sample measuring tip 45 occupies the tip-sample non-contact positions. In accordance with various embodiments, the scanner 70 may be an (X-Y-Z) scanner with the substrate 20 and the sample 30 placed thereon.

A sensor unit 75 is disposed proximate to the distal end 41 of the cantilever 40 and is configured to obtain, during the oscillation of the measuring tip 45 and the translational movement, tip position measurements of the measuring tip 45 as being reflective of the sample 30 topography at multiple sample 30 locations from which an image may be produced. In accordance with still further embodiments, the sensor unit 75 may include an optical sensor, an optical deflection sensor, a thermal positioning sensor or similar types of sensors that are suitable of measuring tip displacement information. Moreover, the cantilever 40 may include an integrated deflection sensor 76 to operate alone or in combination with the sensor unit 75.

The apparatus and methods described above are suitable for high-speed imaging. Note that the cantilever 40 has a deflection and amplitude signal that are a measure of the tip-sample interaction force. Typically, a feedback mechanism on the Z-scanner that holds the substrate 20 and the sample 30 is employed for imaging with a constant tip-sample interaction force, whereby a constant deflection or amplitude of the cantilever 40 is maintained. The feedback signal is taken as a measure of the sample 30 topography. The bandwidth of imaging in such methods is limited by the Z-scanner's response which is, typically, less than 1 kHz. High-speed images can be obtained in open-loop operation of the Z-scanner in constant-height mode in which the change in deflection or amplitude signal is taken as a measure of the sample 30 topography.

The tip-sample interaction force in this mode, however, varies with the sample 30 profile. Since the electrostatically-actuated cantilever 40 is active, it can be used for reducing the tip-sample interaction force during constant-height high-speed imaging. A feedback scheme implemented on the DC voltage, $V_0$, between the cantilever 40 and the substrate 20, can reduce the tip-sample interaction force. For example, the image signal from a previous scan-line can be used for implementing such a scheme. Note that the bandwidth of such a feedback operation is dictated by the first resonant mode, whose frequency can be in excess of 100 kHz.

In accordance with embodiments, the cantilever 40 dynamics, the tip-sample interaction forces and the external input forces may be described. The dynamics of the electrostatically-actuated cantilever 40 are modeled as:

$$m_i \ddot{x}(t) + c_i \dot{x}(t) + k_i x(t) = \frac{\epsilon_0 A V(t)^2}{2(l - x(t))^2} + \phi(x(t)), \quad (1)$$

where $m_i$, $c_i$ and $k_i$ are the effective mass, damping coefficient and spring constant corresponding to the $i_{th}$ mode of the cantilever 40, respectively, x is the deflection of the cantilever 40 from its resting position, $\epsilon_0$, V, l and A are the electric permittivity of air, the voltage applied for electrostatic actuation and the effective separation and area between the cantilever 40 and the substrate 20 and the sample 30, respectively, and $\Phi$ denotes the nonlinear tip-sample interaction force.

The electrostatic force is modeled assuming that the cantilever 40 and the substrate 20 behave like two oppositely charged parallel plates. Note from Eq. (1) that the mechanical restoring force on the cantilever 40 increases linearly with x whereas the electrostatic pull-in force increases more rapidly as a nonlinear function of x. As a result, the cantilever 40 can snap into the sample 30 in an unstable manner if the deflection x>l/3. As such, the cantilever 40 may be operated in the stable region such that x(t)<l/3 for all time t.

In SPM, the tip-sample interaction force is characterized by a long-range weak attractive force, a short-range strong repulsive force, and a strong adhesion force during tip-sample contact. Here, the nonlinear tip-sample interaction force $\Phi(x)$ is modeled as a piecewise linear function given by:

$$\phi(x) = \begin{cases} 0 & \text{if } x \geq -g+d; \\ -k_a(x+g-d) + c_a\dot{x}, & \text{if } -g \leq x < -g+d; \\ -k_a(x+g-d) + k_r(x+g) + c_a\dot{x} + c_r\dot{x}, & \text{if } x < -g. \end{cases} \quad (2)$$

where $k_a$, $k_r$ are equivalent adhesive (attractive) and repulsive spring constants, $c_a$, $c_r$ are the equivalent adhesive and repulsive damping coefficients, g is the initial tip-sample separation and d is the length of the adhesive region. Here, $\Phi(x)$ is a nonconservative model of the tip-sample interaction force, which takes into account the energy dissipation in the sample 30 when $c_a$ and $c_r$ are nonzero. When imaging soft materials, such as thin polymer films, the tip-sample adhesion force has a significant effect on the cantilever 40 response. That is, when the cantilever 40 is forced to penetrate the surface, its response is dominated by the strong van der Waals repulsive force and, when it is forced to retract, its response is dominated by the strong adhesive force.

The cantilever 40 parameters in Eq. (1) may be identified experimentally by performing a frequency sweep and by obtaining an approach curve using electrostatic actuation. As mentioned above, the cantilever 40 is actively bent, deflected or displaced towards the substrate 20 and the sample 30 by electrostatic forces such that the measuring tip 45 comes close to the sample 30 surface 31 (i.e., between about 200 to about 300 nm) when the frequency response data are collected. The fundamental resonant frequency of $\omega_1 = \sqrt{k_1/m_1}$, quality factor of $Q_1 = \omega_1 m_1/c_1$, and the electrostatic force constant $K_{esf} = \epsilon_0 A/2m_1$ of the cantilever 40 at the near-contact position were 50.7 kHz, 0.73 and $5.28 \times 10^{-22}$ Nm$^2$/V$^2$, respectively. Note in Eq. (1) that the effective spring constant of the cantilever 40 reduces due to the electric field gradient as a nonlinear function of deflection x and DC voltage, $V_0$. The resonant frequency of the cantilever 40 reduces from its nominal value as it approaches the sample 30 surface 31. The second peak in the frequency response corresponds to a resonant frequency of the cantilever 40. This mode arises due to the in-phase bending of support arms of the cantilever 40. The third peak in the frequency response corresponds to the second bending mode of the cantilever 40.

The model parameters are chosen to match both static and dynamic experimental data. When an input DC voltage, $V_0$, of 2.8 V is applied, the tip-sample separation becomes zero with minimal tip-sample interaction force. This simulates the condition of the measuring tip 45 gently touching the sample 30 surface 31. When the AC voltage, $V_{ac}$, at a frequency of, for example, 858.8 kHz is superposed over the DC voltage, $V_0$, the deflection signal oscillates, which simulates the IC operation in the second bending mode. The amplitude of the higher mode oscillations increases when the amplitude of the AC voltage, $V_{ac}$, is increased.

Figure 3:
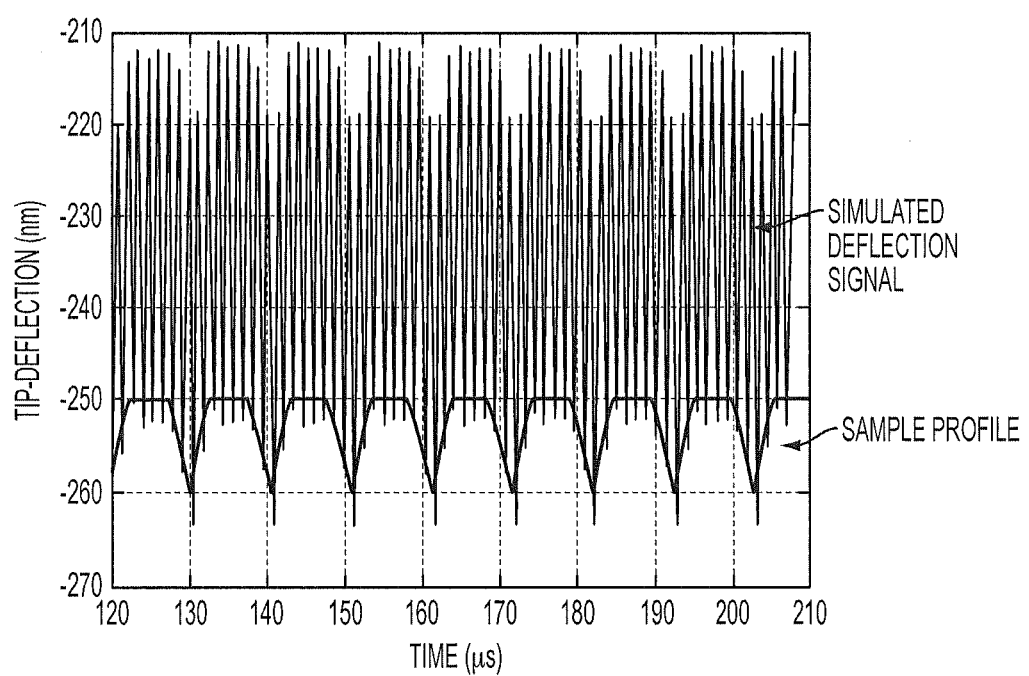
FIG. 3 is a graph of a deflection signal reflective of positions of a tip of the cantilever of FIG. 2.

To demonstrate the IC imaging method using higher mode actuation, the parameter g in Eq. (2) is modulated to create a sample profile. With g as a triangular waveform, the corresponding variation in the higher mode deflection signal is shown in FIG. 3, which is a graph of measuring tip 45 deflection vs. time (and measuring tip 45 position as driven by the scanner 70). The simulation corresponds to constant-height scanning without the Z-scanner's feedback (i.e., open-loop operation), where the deflection signal 'carries' the topography information. Note in FIG. 3 that the deflection signal has sustained higher mode oscillations which are modulated in the low frequency regime by the topography of the sample 30. Sustained oscillations imply reliable IC imaging independent of the topographic variations on the sample 30 surface 31. The topography signal can be obtained by direct sampling of the deflection signal after low-pass filtering. This method can be employed in SPM systems that can be fabricated at lower cost, since it does not require demodulation electronics that are typically required for conventional IC-imaging methods. Note that the IC operation can also potentially improve tip-wear and reduce sample damage during imaging.

In the approach curve obtained when a second mode signal is applied, the second mode oscillations ride on top of the low frequency deflection signal. The first and the second bending modes of the cantilever 40 are widely separated in frequency from each other. The cantilever 40 response in the low frequency regime is dictated by its first bending mode and the tip-sample interaction force which occurs at the oscillation frequency near the second bending mode is outside the bandwidth of the first mode's dynamics. This high frequency tip-sample interaction force minimally affects the effective low frequency response of the cantilever 40 in the presence of the sample 30. From such a response follows the imaging scheme.

Figure 4:
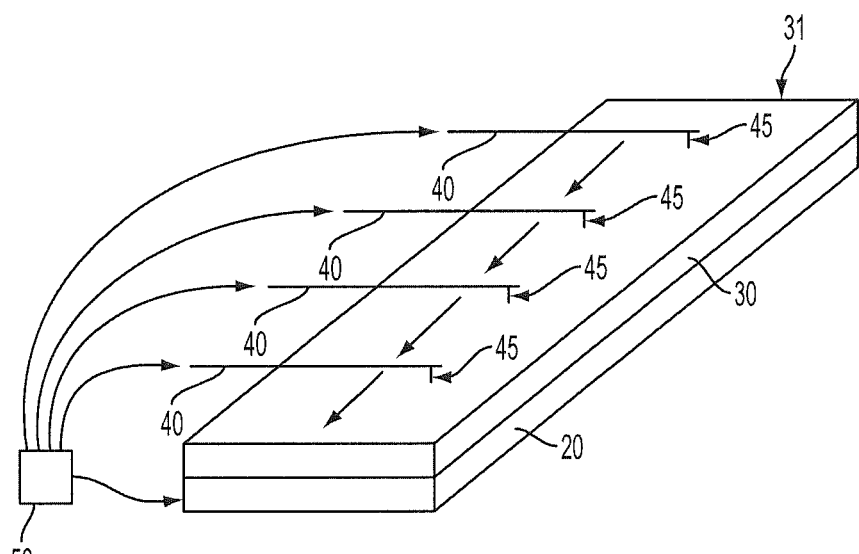
FIG. 4 is a perspective view of a plurality of the cantilevers of FIG. 2.

With reference to FIG. 4 and, in accordance with further embodiments, the cantilever 40 may be provided as a plurality of cantilevers 40 that each includes a measuring tip 45 and which are each arrayed across a surface 31 of the sample 30. Here, the circuit 50 is coupled to the substrate 20 and each of the cantilevers 40 in a similar manner as described above, such that the substrate 20 and sample 30, being displaced relative to the cantilevers 40 by scanner 70, each model a separate portion of the sample 30. Thus, parallel accessing of a relatively large sample 30 by numerous, relatively small cantilevers 40 is possible.

According to another aspect of the invention, an imaging and position control method is provided by which an image of a sample 30 topography is obtained from a deflection signal that is reflective of positions of a measuring tip 45 for measuring the sample 30 topography. Here, the measuring tip 45 is deflected towards and moved across the sample 30 and, while deflected, is further caused to oscillate between tip-sample contact positions and tip-sample non-contact positions.

Figure 5:
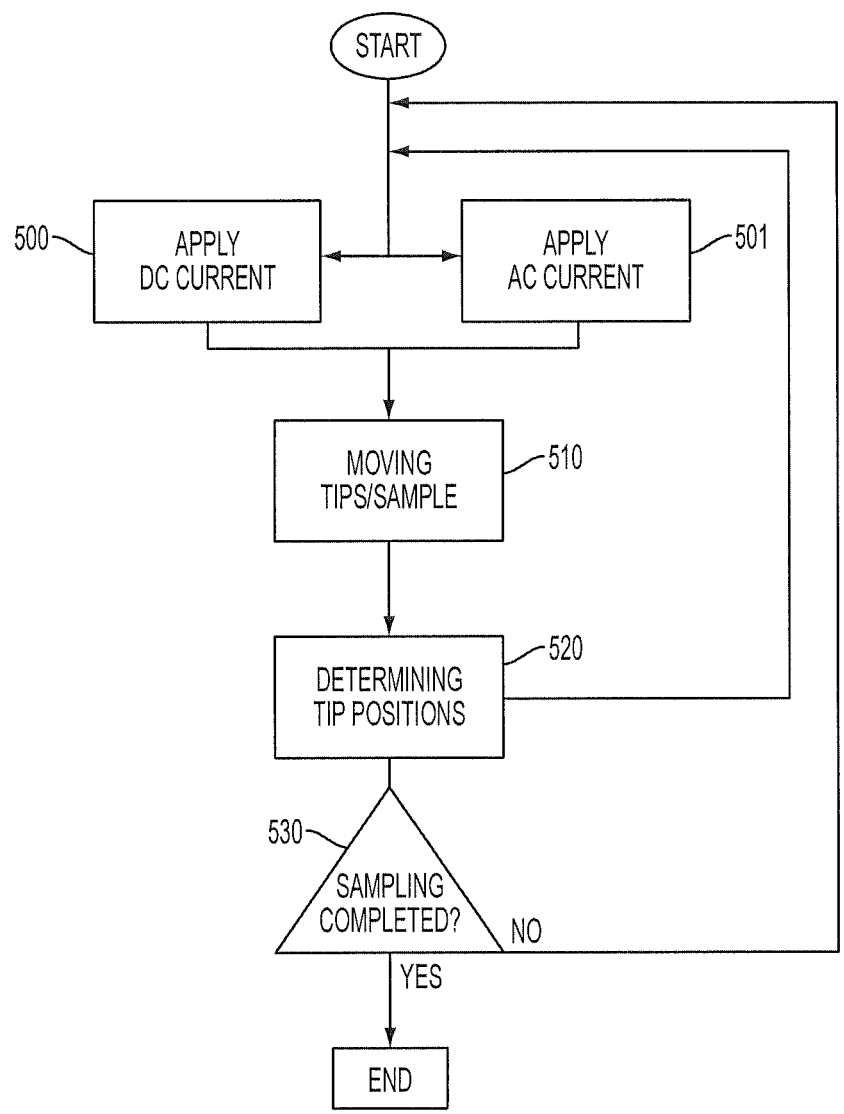
FIG. 5 is a flow diagram illustrating an imaging and position control method in accordance with embodiments of the invention.

With reference to FIG. 5 and, in accordance with yet another aspect of the invention, an imaging and position control method is provided and includes deflecting cantilevers 40, each being arrayed across a sample 30 having a distal end measuring tip 45, to reduce a distance between each of the measuring tips 45 and the sample 30 from an initial undeflected distance by applying a DC voltage, $V_0$, to each of the cantilevers 40 (500). The method further includes causing each of the measuring tips to oscillate between tip-sample contact positions and tip-sample non-contact positions by applying an AC voltage, $V_{ac}$, to each of the cantilevers 40 (501) on top of the DC voltage, $V_0$.

The method also includes translational moving of each of the cantilevers 40 relative to the sample 30 (510) and determining measuring tip 45 positions during the oscillating and the translational moving from which a nano-scale image reflecting a sample 30 topography is obtainable (520) from a sampled filtered signal reflective of the determined measuring tip 45 positions that may also be employed to re-position each of the cantilevers 40 (see the "interior" return arrow of FIG. 5). Following the determining, if the sample 30 topography is found to be fully imaged (530), the method is ended and, if the sample 30 topography is not found to be fully imaged (530), control reverts to the 500 and 501 operations.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. An apparatus, comprising:
a cantilever, having a distal end tip, disposed with the tip positioned at a first point at an initial distance from a sample; and
a circuit, which is electrically coupled to a substrate on which the sample is layered and the cantilever,
the circuit being configured to apply a low frequency deflection signal carrying topography information of the sample to deflect the cantilever toward the sample, the deflection signal being insufficient to cause the tip to come into contact with the sample such that the tip is displaced to a second point at a second distance from the sample, which is shorter than the initial distance, and, simultaneously with the application of the deflection signal,
the circuit being further configured to apply alternating current to the tip to thereby cause the tip to oscillate about the second point between tip-sample contact positions and tip-sample non-contact positions, and
wherein the circuit comprises a direct current source and an alternating current source disposed in series between a substrate on which the sample is layered and the cantilever.

2. The apparatus according to claim 1, wherein application of direct current is dictated by a bending mode of the cantilever and a tip-sample interaction force generated between the tip and the sample.

3. The apparatus according to claim 1, wherein the tip is oscillated at a frequency corresponding to a vertical resonance mode of the cantilever.

4. The apparatus according to claim 1, wherein the cantilever and the tip are each plural in number and arrayed across a surface of the sample.

5. The apparatus according to claim 1, wherein the apparatus comprises an optical deflection sensor.

6. The apparatus according to claim 1, wherein the apparatus comprises a cantilever with an integrated deflection sensor.

7. The apparatus according to claim 4, further comprising a scanner to move at least one of each of the cantilevers relative to the sample and the sample relative to each of the cantilevers.

8. The apparatus according to claim 4, wherein tip position measurements for each of the tips of each of the cantilevers are obtained by direct sampling of a cantilever deflection signal as being reflective of sample topographies at multiple sample locations.

9. An apparatus, comprising:
a substrate on which a sample is layered;
a plurality of cantilevers, each having a distal end tip, disposed with each of the tips respectively positioned at a first point at an initial distance from the sample;
a circuit, which is electrically coupled to the substrate and each of the cantilevers, the circuit being configured to apply a low frequency deflection signal carrying topography information of the sample to deflect each of the cantilevers toward the sample, the deflection signal being insufficient to cause the tips to come into contact with the sample such that each of the tips is respectively displaced to a second point at a second distance from the sample, which is shorter than the initial distance, and the circuit being further configured to apply alternating current to each of the cantilevers to thereby cause the each of the tips to oscillate about the second point between tip-sample contact positions and tip-sample non-contact positions; and
a translation unit to move the sample relative to the cantilevers;
wherein tip position measurements for each of the tips of each of the cantilevers are obtained by direct sampling of cantilever deflection signals during the oscillation and the movement as being reflective of sample topographies at multiple sample locations, and
wherein the circuit comprises a direct current source and an alternating current source disposed in series between the substrate and each of the plurality of cantilevers.

10. The apparatus according to claim 9, wherein application of direct current is dictated by a bending mode of each of the respective cantilevers and tip-sample interaction forces generated between each of the respective tips and the sample.

11. The apparatus according to claim 10, wherein each of the cantilevers is supported on a supporting structure and comprises:
a hinge; and
an electrostatic-actuation platform, the electrostatic-actuation platform being thinner than the supporting structure and the hinge being thinner than the electrostatic-actuation platform.

12. The apparatus according to claim 10, wherein each of the cantilevers comprises doping.

13. The apparatus according to claim 9, wherein the translation unit moves at least one of each of the cantilevers relative to the sample and the sample relative to each of the cantilevers.

14. The apparatus according to claim 9, wherein each of the cantilevers is arrayed across a surface of the sample.

15. An imaging and position control method by which an image of a sample topography is obtained from a deflection signal reflective of positions of a measuring tip of a cantilever for measuring the sample topography, the measuring tip being deflected towards the sample to a deflection point by a low frequency deflection signal carrying topography information of the sample, the low frequency deflection signal being insufficient to cause the measuring tip to contact the sample, the measuring tip being moved across the sample and, while being deflected by the low frequency deflection signal carrying the topography information of the sample, the measuring tip being further caused to oscillate during the deflection by application of alternating current to the cantilever between tip-sample contact positions and tip-sample non-contact positions about the deflection point, the measuring tip being deflected and caused to oscillate during the deflection b a circuit comprising a direct current source and an alternating current source disposed in series between a substrate on which the sample is layered and the cantilever.

16. The imaging and position control method according to claim 15, wherein the sample topography is obtained from deflection signals reflective of positions of a plurality of measuring tips.

17. An imaging and position control method, comprising:
applying a low frequency deflection signal carrying topography information of a sample to cantilevers to thereby deflect the cantilevers toward the sample to respective deflection points, the deflection signal being insufficient to cause a distal end tip of each of the cantilevers to come into contact with the sample and sufficient to reduce a distance between each of the tips and the sample from an initial un-deflected distance;
applying alternating current to each of the cantilevers simultaneously with the applying of the deflection signal to thereby cause each of the tips to oscillate about the deflection points between tip-sample contact positions and tip-sample non-contact positions during the applying of the low frequency deflection signal;
translational moving of each of the cantilevers relative to the sample; and
determining tip positions during the oscillating and the translational moving from which an image reflecting a sample topography is obtainable,
wherein the applying is executed by way of a circuit comprising a direct current source and an alternating current source disposed in series between a substrate on which the sample is layered and the cantilevers.

18. The method according to claim 17, further comprising:
applying a direct current to each of the cantilevers to achieve the deflecting of each of the cantilevers, the direct current being dictated by a bending mode of each of the respective cantilevers and tip-sample interaction forces generated between each of the respective tips and the sample; and
applying the alternating current to each of the cantilevers to achieve the causing of each of the tips to oscillate.

19. The method according to claim 17, wherein the image comprises a nano-scale topography image of the sample and is obtained from a sampled filtered deflection signal reflective of the determined tip positions.

20. The method according to claim 19, further comprising re-positioning each of the cantilevers in accordance with the deflection signal.

21. The method according to claim 17, further comprising arraying each of the cantilevers across a surface of the sample.

* * * * *